US010080328B2

(12) United States Patent
Kraus

(10) Patent No.: US 10,080,328 B2
(45) Date of Patent: Sep. 25, 2018

(54) MOWER-CONDITIONER HEADER SPEED CONTROL BASED ON FORWARD TRAVEL SPEED

(71) Applicant: DEERE & COMPANY, Moline, IL (US)

(72) Inventor: Timothy J Kraus, Blakesburg, IA (US)

(73) Assignee: DEERE & COMPANY, Moline, IL (US)

( * ) Notice: Subject to any disclaimer, the term of this patent is extended or adjusted under 35 U.S.C. 154(b) by 358 days.

(21) Appl. No.: 14/876,028

(22) Filed: Oct. 6, 2015

(65) Prior Publication Data

US 2016/0021820 A1  Jan. 28, 2016

Related U.S. Application Data

(62) Division of application No. 13/685,799, filed on Nov. 27, 2012, now Pat. No. 9,179,600.

(51) Int. Cl.
A01D 34/66 (2006.01)
A01D 43/14 (2006.01)
A01D 43/16 (2006.01)
A01D 41/127 (2006.01)
A01D 43/00 (2006.01)
A01D 43/08 (2006.01)
A01F 29/14 (2006.01)
A01D 41/14 (2006.01)
(Continued)

(52) U.S. Cl.
CPC ......... A01D 41/127 (2013.01); A01D 34/006 (2013.01); A01D 41/1274 (2013.01); A01D 41/14 (2013.01); A01D 43/00 (2013.01); A01D 43/085 (2013.01); A01D 61/00 (2013.01); A01F 29/14 (2013.01)

(58) Field of Classification Search
CPC .... A01D 34/008; A01D 34/006; A01D 34/66; A01D 69/00; A01D 43/0631; A01D 34/125; A01D 41/127; A01D 41/1274; A01D 34/00; A01D 61/00; A01D 43/00; A01D 41/14
USPC ............... 56/10.2 R, 10.2 A, 10.2 G, 10.2 H, 56/10.8–11.1
See application file for complete search history.

(56) References Cited

U.S. PATENT DOCUMENTS 3,613,336 A    10/1971 Smith
4,009,556 A *  3/1977 Molzahn ................ A01D 69/00
                                                    180/6.48
(Continued)

FOREIGN PATENT DOCUMENTS

EP    0357312 A1    7/1990
EP    0970597 B1    1/2000
(Continued)

OTHER PUBLICATIONS

European Search Report in counterpart application No. 13194185.8, dated Mar. 5, 2014 (6 pages).
(Continued)

Primary Examiner — John Weiss

(57) ABSTRACT

A self-propelled mower includes a rotary cutter bar that feeds cut crop to a driven crop conveying arrangement which delivers the crop to a windrow forming arrangement. The speed at which the crop conveying arrangement delivers crop to the windrow forming arrangement is controlled so as to be a predetermined ratio of the ground speed.

5 Claims, 2 Drawing Sheets

(51) Int. Cl.
*A01D 34/00* (2006.01)
*A01D 61/00* (2006.01)

(56) References Cited

U.S. PATENT DOCUMENTS

| | | | |
|---|---|---|---|
| 4,458,471 A | 7/1984 | Herwig | |
| 4,487,002 A | 12/1984 | Kruse et al. | |
| 4,548,027 A | 10/1985 | Maeoka | |
| 4,671,050 A | 6/1987 | Van Der Lely | |
| 4,967,544 A | 11/1990 | Ziegler et al. | |
| 5,778,644 A * | 7/1998 | Keller | A01D 41/142 56/11.2 |
| 6,068,059 A | 5/2000 | Bajema et al. | |
| 6,167,685 B1 | 1/2001 | Berger et al. | |
| 6,431,981 B1 | 8/2002 | Shinners et al. | |
| 6,553,300 B2 | 4/2003 | Ma et al. | |
| 6,591,591 B2 | 7/2003 | Coers et al. | |
| 6,592,453 B2 | 7/2003 | Coers et al. | |
| 6,726,559 B2 | 4/2004 | Bischoff | |
| 6,951,514 B1 | 10/2005 | Coers et al. | |
| 7,707,810 B2 | 5/2010 | Strosser et al. | |
| 7,730,701 B1 | 6/2010 | Ehrhart et al. | |
| 7,869,922 B2 | 1/2011 | Otto et al. | |
| 2003/0093202 A1 | 5/2003 | Panoushek et al. | |
| 2006/0201732 A1 | 9/2006 | Dunn et al. | |
| 2006/0248868 A1 | 11/2006 | Otto et al. | |
| 2007/0012013 A1 | 1/2007 | Strosser et al. | |
| 2007/0130900 A1* | 6/2007 | Kormann | A01D 43/085 56/10.2 C |
| 2009/0069988 A1 | 3/2009 | Strosser | |
| 2011/0203243 A1 | 8/2011 | Finkler et al. | |
| 2012/0031064 A1 | 2/2012 | Barnett | |
| 2012/0151905 A1 | 6/2012 | Lenton | |

FOREIGN PATENT DOCUMENTS

| | | |
|---|---|---|
| FR | 2464634 A1 | 3/1981 |
| RU | 2450503 C2 | 5/2012 |
| SU | 375050 A1 | 6/1973 |
| SU | 1722288 A1 | 3/1993 |

OTHER PUBLICATIONS

Eurasian Search Report in counterpart application No. 201301202, dated Apr. 29, 2014 (2 pages).

* cited by examiner

MOWER-CONDITIONER HEADER SPEED CONTROL BASED ON FORWARD TRAVEL SPEED

CROSS-REFERENCE TO RELATED APPLICATIONS

Pursuant to 35 USC § 121, this application is a divisional of prior application Ser. No. 13/685,799, filed Nov. 27, 2012, which is herein incorporated by reference in its entirety.

FIELD OF THE DISCLOSURE

The present disclosure relates to self-propelled mowers and mower-conditioners and more specifically relates to controlling the speed of crop flow through the machine.

BACKGROUND

Mowers and mower-conditioners typically operate within a ground speed range from 5 to 10 mph when mowing. When the vehicle is operated at this speed, crop flows into the header at this rate, is temporarily accumulated, and then expelled out the rear of the mower-conditioner to form a windrow. The uniformity of the formed windrow density (defined as quantity of crop per unit area) is constant as long as the forward travel speed of the mower-conditioner is unchanged. However, when the forward speed is reduced significantly, much of the crop that has been accumulated in the header at the higher speed is expelled from the rear of the mower-conditioner at this significantly reduced speed resulting in a bunching up of the crop with an attendant increase in the windrow density. The bunched up crop dries slower than the crop in the remaining portions of the windrow that is formed at a lesser crop density causing a delay in the time that the crop can be baled without resulting in spoilage. It is noted that bunched up crop occurs most of the time at the headlands of the field when the operator slows down to turn the mower-conditioner around for the next pass through the field.

Accordingly, what is needed is some way to prevent crop from bunching up during a significant reduction in the ground speed of the mower-conditioner, as when turning at the headland of a field during mowing operation.

SUMMARY

This summary is provided to introduce a selection of concepts that are further described below in the detailed description and accompanying drawings. This summary is not intended to identify key or essential features of the appended claims, nor is it intended to be used as an aid in determining the scope of the appended claims.

According to an aspect of the present disclosure, there is provided a mower control system for overcoming the aforementioned problem of introducing bunched crop into a windrow being formed.

According to an aspect of the present disclosure, a mower has a crop conveying arrangement speed control, which may include a ground speed sensor providing an electrical ground speed signal indicative of a forward ground speed of the mower, and an electronic controller coupled for receiving the ground speed signal and being coupled for sending a control signal to a controllable drive device of a conveying arrangement. The electronic controller is configured to send a control signal to the controllable drive device of the conveying arrangement in response to a sensed decrease in ground speed to decrease the speed of the conveying arrangement by an amount proportional to the sensed decrease in ground speed.

An object of the present disclosure is to control the speed of the delivery of cut crop for the formation of a windrow so that crop bunching is reduced or eliminated.

The aforementioned object is achieved by controlling the delivery speed of the internal components of the mower in proportion to forward travel speed.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

DETAILED DESCRIPTION

Figure 1:
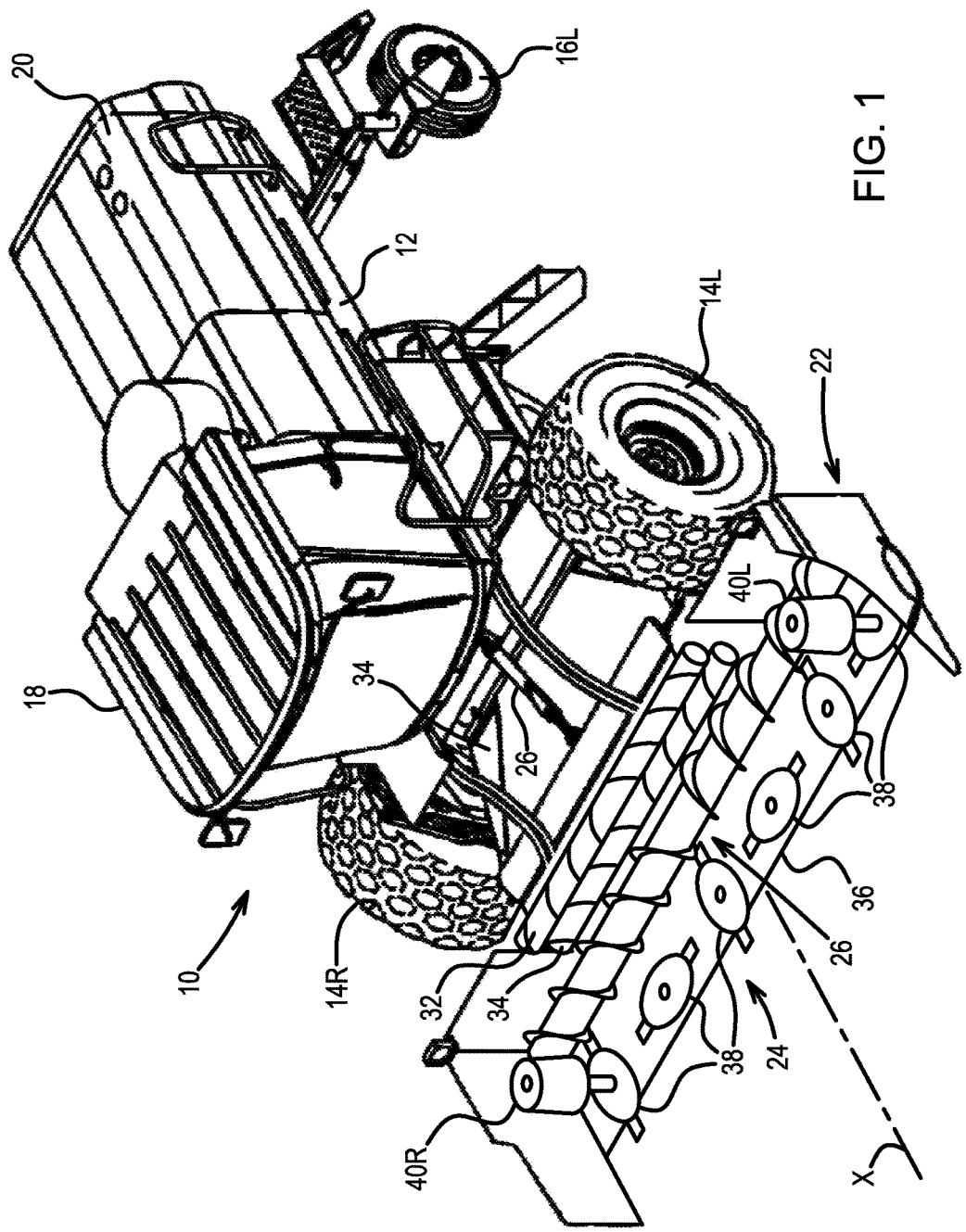
FIG. 1 is a schematic, left front perspective view of a self-propelled mower-conditioner of the type with which the present invention is particularly adapted for use.

Referring to FIG. 1, there is shown a self-propelled mower-conditioner 10 operable to mow and collect standing crop in a field, condition the cut crop as it moves through the machine to improve its drying characteristics, and then return the conditioned material to the field in a windrow or swath. The windrower 10 includes a main frame 12 supported on driven right and left front wheels 14R and 14L, respectively and on right and left caster mounted rear wheels, of which only a left rear wheel 16L is shown. Carried on a forward end region of the frame 12 is a cab 18. Mounted on the frame 12 behind the cab 18 is a housing 20 within which is located a power source (not shown) such as an internal combustion engine. A harvesting header 22 is coupled, in a well-known manner, so as to be supported by the forward end of the frame 12. Operator controls (not shown) are provided in the cab 18 for operation of the mower-conditioner 10, including the attached harvesting header 22.

The harvesting header 22 could take many configurations but is here shown as including a rotary disc cutter bar 24 that delivers cut crop to following crop converging auger 26 that delivers crop rearward into a discharge passage 28 for further processing by a crop conditioning arrangement comprising upper and lower crop conditioner rolls 30 and 32, respectively. Conditioned crop is expelled to the rear by the conditioner rolls 30 and 32 and is formed into a windrow by upright right and left, windrow forming panels (not shown) which are supported by a top wall of an open-bottomed housing 34 located between the front wheels 14R and 14L.

The rotary disc cutter bar 24 includes an elongate gear housing 36 supporting a plurality of cutter discs 38 for rotation, with gearing (not shown) located within the housing 36 being arranged in a manner well known in the art so that the cutter discs 38 located rightward a longitudinal center line X are driven counterclockwise by a hydraulic fluid motor 40R coupled to the rightmost cutter disc 38, while the cutter discs 38 located leftward of the center line X are driven clockwise by a hydraulic fluid motor 40L coupled to the leftmost cutter disc 38.

Figure 2:
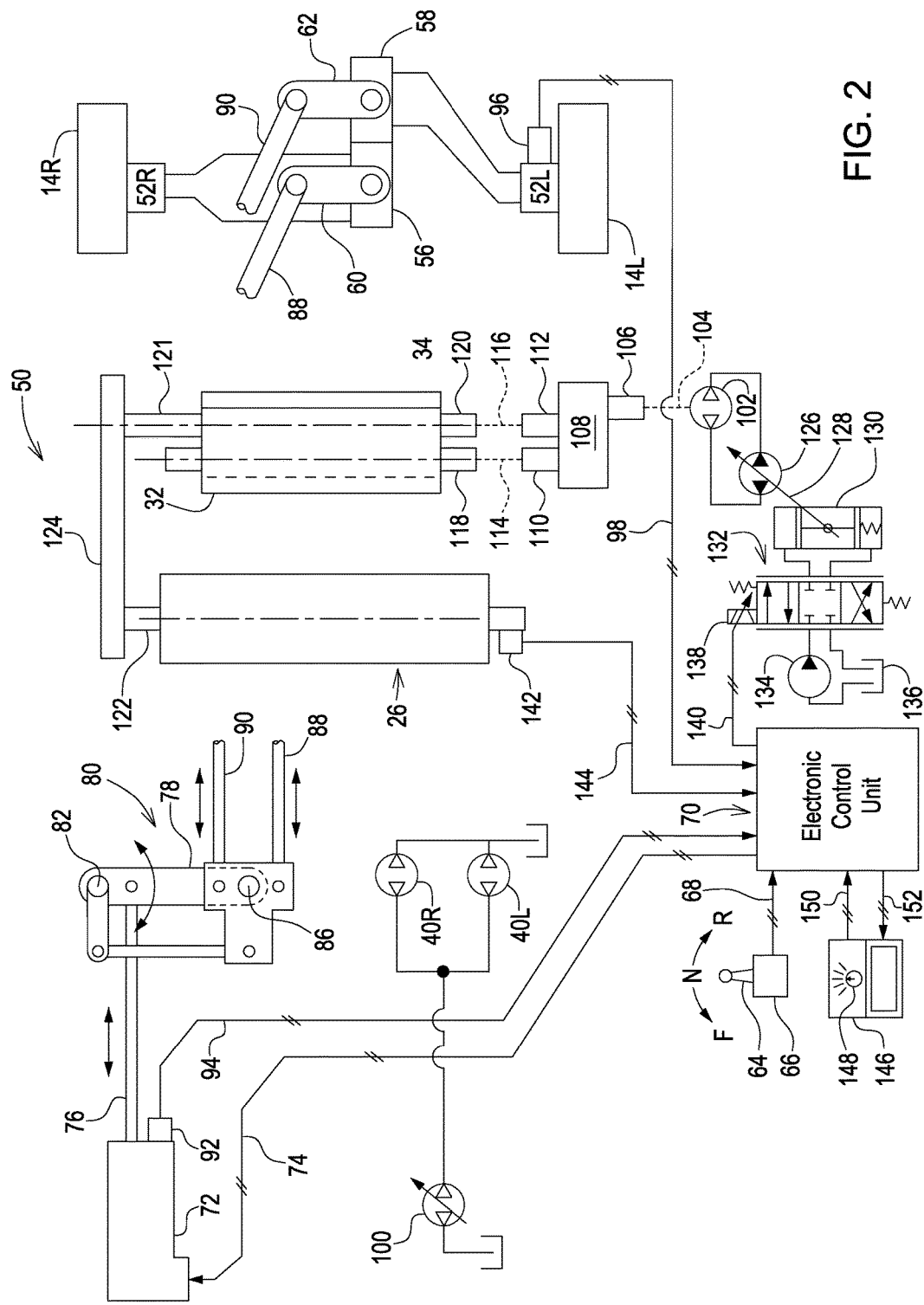
FIG. 2 is a schematic of an electro-hydraulic control system for the self-propelled mower-conditioner shown in FIG. 1 and having the purpose of slowing the rate that cut crop is conveyed through the windrower when operating at travel speeds below that normally occurring at typical mowing speeds.

Referring now to FIG. 2, there is shown an electro-hydraulic control system 50 for controlling the operation of the front drive wheels 14R and 14L, the rotary disc cutter bar 24, the converging auger 26 and the upper and lower crop conditioning rolls 32 and 34.

Specifically, the control system 50 includes right and left wheel drive motors 52R and 52L, respectively coupled for driving the right and left front drive wheels 14R and 14L. Reversible, variable displacement fluid pumps 56 and 58 are respectively hydraulically coupled to the fluid motors 52R and 52L by respective pairs of fluid hoses, or the like, and include respective displacement control levers 60 and 62 mounted for being pivoted fore-and-aft from respective neutral positions so as to change the displacements of the pumps 56 and 58 so as to change the speed and/or driving direction of the motors 52R and 52L. Control of the displacement control levers 60 and 62 is effected by manual operation of a hydro-lever 64 that is mounted for being pivoted fore-and-aft within a guide slot (not shown) for effecting forward, neutral and reverse driving conditions in the front drive wheels, with speed increasing in the forward direction with increasing pivotal movement of the lever in a forward direction F beyond a neutral position N, and with speed increasing in the rearward direction with increasing pivotal movement of the lever in a rearward direction R beyond the neutral position N, as is well known in the art. A lever position sensor 66 is associated with the hydro-lever 64 and generates an electrical speed and direction input signal corresponding to the angular position of the hydro-lever, and may include information such as whether or not the hydro-lever is presently moving, the direction of movement, and the instantaneous speed of hydro-lever movement. The signal generated by the sensor 66 is coupled, by a hydro-lever position signal lead 68, to an electronic control unit (ECU) 70. The ECU 70 processes the hydro-lever position signal and sends out a desired proportional speed/direction control signal to an electric linear actuator 72 by way of a speed/direction control signal line 74. The actuator 72 includes a control rod 76 coupled to an output link 78 of a four-bar linkage 80, the output link 78 being mounted at one end for pivoting about a fixed pivot 82 and having another end pivotally mounted to a control plate 84, as at 86. The control plate 84 is respectively connected to the pump displacement control arms 60 and 62 by motion transfer links 88 and 90. A position feedback sensor 92 is associated with the actuator 72 and generates a feedback signal coupled to the ECU 70 by a feedback signal lead 94, with the feedback signal being processed by the ECU which operates to de-energize the actuator 72 when it has moved a distance corresponding to the proportional speed/direction control signal which was initially received by the actuator 72. Also providing vehicle speed information for use by the ECU 70 is a travel speed sensor 96, shown here as associated with the wheel drive motor 52L, the travel speed sensor 96 generating a signal representing the travel speed, with the travel speed signal being coupled to the ECU 70 by a travel speed signal lead 98.

The cutter bar drive motors 40R and 40L are driven through the agency of a variable speed pump 100 to which the motors are connected in parallel. The speed that the motors 40R and 40L is selected by the operator by operation of any well-known hydraulic, electrical or electro-hydraulic displacement control means (not shown) for controlling the displacement of the pump 100 based on the type and condition of crop being cut, noting that the cutter discs 38 cut by impact and are required to be rotated at a predetermined minimum speed for effecting effective, efficient cutting of crop regardless of the travel speed of the mower-conditioner 10.

The converging auger 26 and the upper and lower conditioner rolls 32 and 34 are driven by a reversible hydraulic motor 102 coupled, as indicated by a dashed line 104, to an input shaft 106 of a gear case 108 having first and second output shafts 110 and 112, respectively, coupled, as indicated by dashed lines 114 and 116, to stub shafts 118 and 120 at the left ends of the upper and lower conditioner rolls 32 and 34. Gearing within the gear case 106 effects counter-rotation of the output shafts 110 and 112, and thus counter-rotation of the conditioner rolls 32 and 34 so that crop fed from the converging auger 26 will be grabbed at the nip of the rolls 32 and 34 and expelled rearward to the windrow forming plates. A stub shaft 121 at the right end of the lower conditioner roll 34 is coupled for transferring power to a stub shaft 122 at the right end of the converging auger 26 by a sprocket and chain drive 124, noting that the rotation of the lower conditioner roll 34 results in overshot rotation of the auger 26. A reversible, variable speed pump 126 has a closed loop connection with the motor 102 and includes a swash plate 128 coupled to a piston of a hydraulic displacement controller 130, the piston being received in a cylinder having ports at the opposite sides of the piston coupled to a solenoid-operated proportional direction control valve 132 for selectively receiving fluid from a charge pump 134 or returning fluid to a sump 136. The control valve 132 includes a solenoid 138 that is coupled for receiving a crop throughput speed control signal from the ECU by way of a throughput speed control line 140. A throughput speed sensor 142 is associated with the converging auger 26 and generates a representative throughput speed signal that is sent to the ECU 70 by way of a throughput speed signal line 144. The ECU 70 may be programmed to set a minimum throughput speed at which the converging auger 26 and upper and lower conditioner rolls 32 and 34 must be driven so that crop flows through the header 24 at a speed sufficient to prevent or minimize plugging. For example, if the ratio of throughput speed to ground speed is 1-to-1, the minimum throughput speed may be equivalent to a forward ground speed of 2 mph.

A manual input device 146 is provided for selecting a desired ground speed dependent ratio at which the throughput speed of the converging auger 26 and conditioner rolls 32 and 34 will be caused to automatically operate once a ground speed is selected by operation of the hydro-lever 64. This pre-selected ratio is usually fixed but may be adjustable under certain conditions described below. Depending on the crop and crop condition, the desired crop throughput speed to ground speed ratio is selected by an input dial 148, the input device 146 generating an electrical ratio signal representing the selected ratio, with this ratio signal being connected to the ECU 70 by a ratio signal lead 150. A speed ratio feedback lead 152 is coupled between the ECU 70 and manual input device 146, which includes a display 154 for displaying the speed ratio processed by the ECU by using the information gathered from the actuator position sensor 92 and/or ground speed sensor 96, and throughput speed sensor 142.

It is here noted that it may be desirable to construct the speed ratio selecting device 146 so that it selects an adjustable speed ratio that is automatically increased by a modest amount in response to the hydro-lever position sensor 66 indicating that the hydro-lever 64 has been moved so as to decrease the operating speed. This will insure that crop bunching does not occur during slow down of the mower-conditioner 10 while harvesting crop.

The following describes an operation of the mower-conditioner 10 in a manner for ensuring that crop flow through the header 22 remains relatively uniform, especially when the operator reduces ground speed, as when at an end of a field, for example, so as to avoid or reduce large clumps of crop from being introduced into the windrow being formed by windrow forming shields engaged by the crop expelled by the conditioner rolls 32 and 34. In preparing the mower-conditioner 10 for operation in a field containing standing crop to be cut and windrowed, the operator will first set the displacement of the variable displacement pump 100 so as to cause the cutter bar motors 40R and 40L to be driven at a speed resulting in the discs 38 being rotated at a desired speed for efficiently and effectively cutting the crop, taking into account the type of crop and its condition. Further, assuming that the crop condition is such that the mower-conditioner 10 can be operated at a typical mowing speed, for example in the range of from 5 to 10 mph, the operator will use the dial 148 of the ratio selecting device 146 to select a desired throughput speed to ground speed ratio. For example, a typical setting of the dial 148 may be that for effecting a 1-to-1 ratio for average crop yields, this ratio being that obtained by placing the dial 48 in a straight up position, as illustrated, with each setting increment counter-clockwise from the straight up position reducing the ratio by 0.2, for example, and each setting increment clockwise from the straight up position increasing the ratio by 0.2, for example, with decreasing ratios being more suitable for light crops and increasing ratios more suitable for heavy crops.

The operator will then use the hydro-lever 64 to increase the forward speed of the mower-conditioner to the desired operating speed by pushing the hydro-lever forward from its neutral position N. As the hydro-lever 64 is pushed forwardly, the position sensor 66 will generate a corresponding position signal and transmit it to the ECU by way of the lead 68, with the ECU processing this input signal and outputting a control signal to the electric linear actuator 72 by way of the signal lead 74. This energizes the linear actuator 72 so that it causes the control rod 76 to retract and pivot the control lever 78 forwardly, as viewed in FIG. 2, and cause forward movement of each of the motion transfer links 88 and 90 so as to respectively pivot the displacement control levers 60 and 62 forwardly to increase the displacements of the pumps 56 and 58 so as to cause the front wheel drive motors 52R and 52L to drive the front wheels 14R and 14L at the commanded forward speed. The rod position sensor 92 will sense the position of the control rod 76 and send a feedback signal representing this movement to the ECU 70, by way of the feedback signal lead 94, the ECU processing this feedback signal and acting to deactivate the electrical linear actuator 72 when the position of the rod 76 corresponds to the commanded speed. At the same time, the travel speed sensor 96 will generate a corresponding travel speed signal which is sent to the ECU 70 by way of the signal line 98, this travel speed signal being processed by the ECU and used together with the ratio setting to generate a throughput speed control signal which is sent to the solenoid 138 of the proportional direction control valve 132 by way of the control signal lead 140. The valve 132 shifts to control the flow of fluid to the displacement controller 130 so that the pump 126 pumps fluid for causing the motor 102 be driven for causing the converging auger 26 and conditioner rolls 32 and 34 to be driven to establish the pre-selected fixed drive speed ratio. The converging auger speed sensor 142 generates a speed signal corresponding to the speed at which the converging auger 26 is rotated and transmits this speed signal to the ECU 70 by way of the lead 144. The ECU then processes this signal, and when the speed of the converging auger 26 reaches that wherein the ratio of the peripheral speed of the auger 26 to the ground speed corresponds to the ratio preselected by the ratio setting device 146, current to the solenoid 138 of the valve 132 will be cut off so that the valve shifts to its centered position blocking fluid flow to and from the displacement controller 130 so that the motor 102 continues to be driven so as to drive the auger 26 at the speed for maintaining the pre-selected ratio set by the device 146.

The windrower 10 will then travel across the field at the normal traveling speed selected based upon the type and condition of the crop being harvested. Assuming that the windrower 10 is approaching the end of the field, the operator will effect a reduction in the speed by pulling back on the hydro-lever 64. The electrical linear actuator 72 will again be energized, but this time the control rod 76 will be extended so as to cause the lever 78 to pivot rearward causing rearward movement of the motion transfer rods 88 and 90 and corresponding rearward movement of the displacement control levers 60 and 62 so as to decrease the displacements of the pumps 56 and 58 and corresponding decreases in the speed of the front wheel drive motors 52R and 52L. The control rod position sensor 92 will sense the position of the rod 76 and generate a corresponding signal which is sent to the ECU 70 by way of the lead 94, the ECU 70 processing this signal and turning off the control signal from the control lead 74 so as to de-energize the actuator 72 when the sensed position of the control rod 76 indicates that the control rod is in a new position corresponding to the travel speed commanded by the rearward movement of the hydro-lever 64. At the same time, the ECU 70 will have used the decreasing speed signal generated by the travel speed sensor 96 together with the preselected ratio to cause a decreasing control signal to be sent to the solenoid 138 of the direction control valve 132 to cause it to shift and cause a proportional control of the position of the displacement controller 130 of the pump 126 to effect a slowdown of the speed of operation of the motor 102, with the result that the speed of rotation of the converging auger 26 will decrease, this decreasing speed being sensed by the sensor 142 and sent for being processed by the ECU 70 so as to cause the signal to the solenoid 138 to be cut-off the de-energize the solenoid when the ECU determines that the slowed converging auger 26 is operating at a speed corresponding to that which results in the speed ratio pre-selected by the ratio selecting device 146 being obtained.

If the ratio selecting device 146 is constructed to pre-select a variable speed ratio to automatically increase the speed ratio a small amount when the hydro-lever position sensor 66 sends out a signal indicating that the travel speed is being diminished, then this new ratio will be that at which the ECU 70 will terminate the signal to the control valve 132 controlling the speed of the converging auger 26 when the ECU determines that the converging auger speed sensed by the sensor 142 corresponds to that at which the peripheral speed of the converging auger corresponds to that at which this increased speed ratio is met.

Having described one or more example embodiments, it will become apparent that various modifications can be made without departing from the scope of the accompanying claims.

What is claimed is:

1. A mower having a frame supported for traveling over a field of crop at a variable ground speed, a header supporting a driven crop cutting arrangement across a forward region of the header, a windrow forming arrangement located at a rear region of the header and a driven crop conveying arrangement located for receiving cut crop from the cutting arrangement and delivering the cut crop to the windrow forming arrangement, a crop conveying arrangement speed control, comprising:
   a ground speed sensor providing an electrical ground speed signal indicative of the forward ground speed of the mower; and
   an electronic controller coupled for receiving the ground speed signal and being coupled for sending a control signal to a controllable drive device of the conveying arrangement;
   the electronic controller being configured to send a first control signal to the controllable drive device of the conveying arrangement in response to a sensed decrease in a first ground speed to decrease the speed of the conveying arrangement by a first pre-selected adjustable ratio of the speed of the conveying arrangement to the forward ground speed, and the electronic controller being configured to send a second control signal to the controllable drive device of the conveying arrangement in response to a sensed decrease in a second ground speed, which is slower than the first ground speed, to decrease the speed of the conveying arrangement by a second pre-selected adjustable ratio of the speed of the conveying arrangement to the forward ground speed, which is larger than the first pre-selected adjustable ratio.

2. The mower of claim 1, wherein a pre-selected minimum of the speed of the conveying arrangement is programmed into the electronic controller; and the controller being responsive for preventing the conveying speed from being reduced below the pre-selected minimum speed value at which the conveying arrangement must be driven to reduce plugging.

3. The mower of claim 2, wherein the pre-selected minimum speed is approximately two mph.

4. The mower of claim 1, the crop conveying arrangement comprising a controllable drive device speed sensor to detect the speed of the controllable drive device and to provide electrical controllable drive device signals indicative to the speed of the controllable drive device to the electrical controller.

5. The mower of claim 1, comprising:
   a ratio selecting device configured to pre-select variable speed ratios including the first pre-selected adjustable ratio and the second pre-selected adjustable ratio.

* * * * *